Sept. 1, 1959
C. G. DEWEY
2,902,625
PROTECTIVE RELAYING SYSTEM FOR AN ELECTRIC
POWER TRANSMISSION CIRCUIT
Filed Feb. 6, 1956
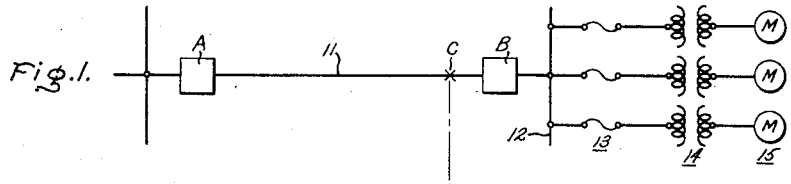
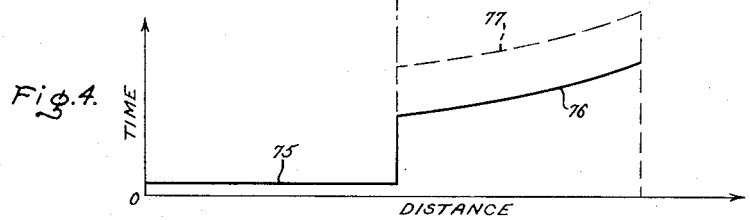
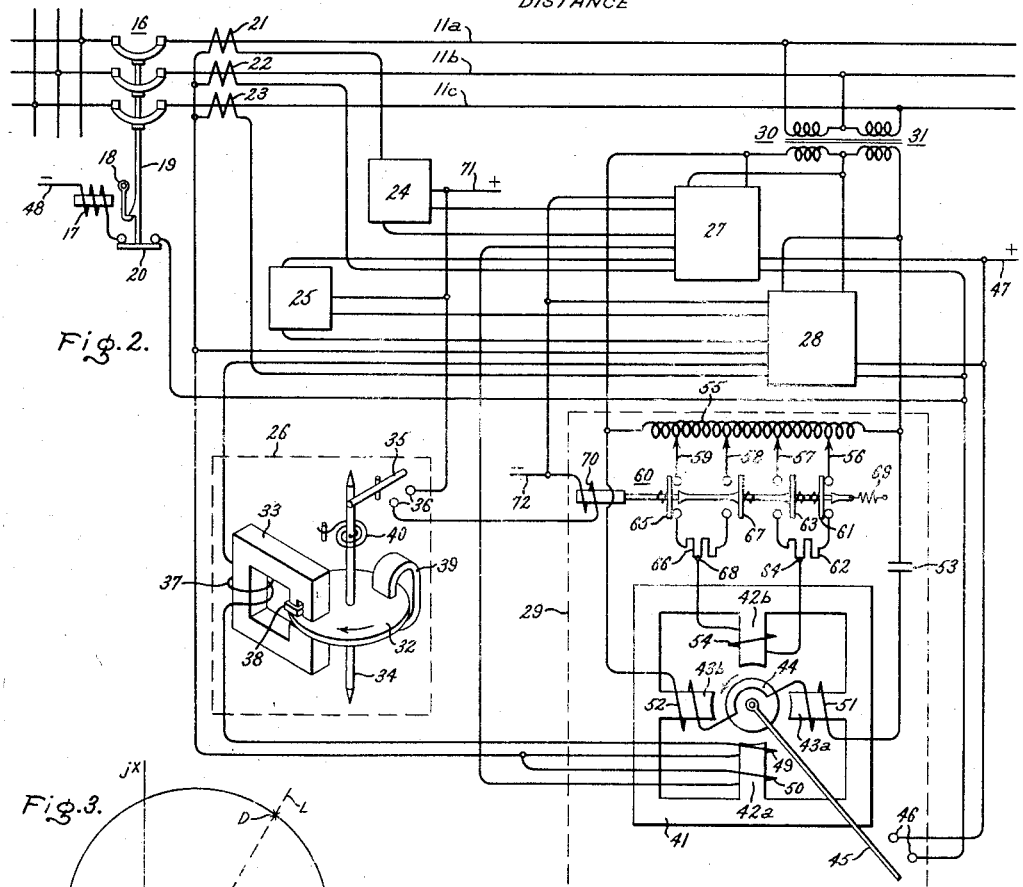
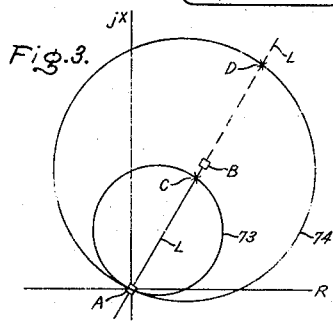
Inventor:
Clyde G. Dewey,
by J. Wesley Haubner
His Attorney.

United States Patent Office 2,902,625
Patented Sept. 1, 1959

2,902,625

PROTECTIVE RELAYING SYSTEM FOR AN ELECTRIC POWER TRANSMISSION CIRCUIT

Clyde G. Dewey, Philadelphia, Pa., assignor to General Electric Company, a corporation of New York Application February 6, 1956, Serial No. 563,641

9 Claims. (Cl. 317—36)

This invention relates to relaying systems for protecting electric power transmission circuits, and more particularly to a system utilizing distance relays for protecting an electric power "substansmission" line.

The relatively short, lower voltage (e.g., 33,000 volts or less phase-to-phase) circuits of an electric power transmission system are commonly referred to as "subtransmission" lines. Subtransmission lines generally have been protected against fault or short circuit conditions by overcurrent or directional overcurrent relaying systems. The relatively complex and expensive distance or pilot relaying schemes which are employed on higher voltage transmission lines usually are not economically justified for subtransmission line protection.

A relaying system for a subtransmission line section connecting the transmission system to distribution circuits and utilization apparatus should be capable of selectively performing two functions. Upon the occurrence of a fault condition on the protected section of the subtransmission line, the relaying system must respond as rapidly as possible to isolate the faulted section from the source of power generation. Toward this end, instantaneous-overcurrent relays in conjunction with suitable directional relays are commonly used. In addition, the relaying system should realize a delayed response to a fault condition occurring on any utilization apparatus or adjoining subtransmission line section, thereby providing for the abnormal situation wherein the associated individual protective means fails within an appropriate time to remove the faulted elements from service. The latter slower, supplementary operation provides back-up protection. To assure proper selectivity with the primary protective means of adjoining circuit elements, the instantaneous-overcurrent relays used for high-speed responses to faults occurring on the protected section must never operate in response to faults on the adjoining elements. Therefore, such relays must be adjusted to operate only in response to greater than the maximum magnitude of short circuit current that can flow if a fault should occur at the distant end of the protected section. Since fault current magnitude depends upon the amount of power generation, the amount of line section protected by the instantaneous-overcurrent relays will be reduced during reduced connected generation capacity. Where the possible variation between maximum and minimum generation conditions is great, the instantaneous relays may be completely unresponsive to any section fault occurring during the condition of minimum generation, and thus the desirable high-speed relaying operation is not obtained.

The delayed back-up protection afforded by the above described relaying system is commonly obtained by means of time-overcurrent relays. The timing and sensitivity of such relays must be adjusted to coordinate selectively with the protective means provided for the circuit elements adjoining the subtransmission line section being protected by said relaying system. The sensitivity requirements of the time-overcurrent relay are established under minimum generation conditions, and consequently the relay may operably respond to faults located on relatively remote sections of the subtransmission line during conditions of maximum generation. In order to coordinate properly with the protective means of these remote sections, the timing of the relay may have to be much greater than would be necessary to provide adequate coordination with the protective means of the immediately adjacent circuit elements.

Accordingly, it is an object of this invention to provide for subtransmission line protection a simple, low cost selective relaying system employing distance type relays which function substantially independently of fault current magnitude.

It is another object of the invention to provide a subtransmission line relaying system wherein instantaneous primary protection and delayed back-up protection are provided by distance relays in combination with time-overcurrent relays.

Another object of the invention is the provision of a 2-step or 2-zone protective relaying system for subtransmission lines, the portion of line included in each zone of operation being substantially fixed and independent of fault current magnitude.

Still another object of the invention is the provision of a 2-step or 2-zone subtransmission line protective relaying system, the second zone operation being delayed by only the minimum amount commensurate with selective back-up protection.

In carrying out my invention in one form, I provide for a three-phase subtransmission circuit three distance relays of the inherently directional discriminating mho type, each relay being associated with a different phase of the circuit. Each distance relay has an initial operating range which encompasses a predetermined portion of the protected circuit, and instantaneous relay operation is obtained in response to a fault on this predetermined portion. Separate time-overcurrent means associated with each distance relay operates in delayed response to greater than a predetermined magnitude of circuit current to increase the operating range of the associated distance relay. The operating time of each time-overcurrent means is an inverse function of the amount of circuit current. Thus, upon the occurrence of a fault on the predetermined portion of the protected circuit, at least one distance relay operates instantly, while a more remote fault will cause the operation of a distance relay only after the associated time-overcurrent means has operated.

My invention will be better understood and further objects and advantages will be apparent from the following description taken in conjunction with the accompanying drawing in which Fig. 1 is a single line diagram of a subtransmission circuit; Fig. 2 is a schematic representation of a preferred embodiment of my protective relaying system as it is utilized at one terminal of the subtransmission circuit shown in Fig. 1; Fig. 3 is a graphical representation, in terms of impedance, of the operating characteristics of a distance type relay shown in Fig. 2; and Fig. 4 is a graphical time-distance representation of the operating characteristic of the relaying system shown in Fig. 2.

As shown in the single line diagram of Fig. 1, a section 11 of an electrc power subtransmission line extends between opposite ends or terminals A and B. Terminal A is connected to an electric power system, not shown, which includes a source or sources of power generation. Terminal B is connected to a distribution circuit 12 which supplies utilization apparatus such as the illustrated power fuses 13, transformers 14, and motors 15, The subtransmission line section 11 transmits 3-phase alternating current of power frequency, such as 60 cycles per second, from terminal A to terminal B at relatively low voltage, i.e., 33,000 volts or less phase-to-phase.

A protective relaying system is provided at terminal A to perform quickly a control operation, such as opening a circuit interrupter, upon the occurrence of a phase fault, i.e., upon the occurrence of a short circuit between phase conductors, at some point on the associated subtransmission line section. The same relaying system is arranged selectively to coordinate with the power fuses 13 whereby the same control operation is performed in delayed response to a similar fault occurring on any one of the connected motor feeders or associated distribution circuits.

Fig. 2 illustrates the relaying system at terminal A. The phase conductors comprising the protected subtransmission line 11 are designated 11a, 11b and 11c. A three-pole circuit interrupter 16 shown in its circuit making position and having an electroresponsive trip coil 17 is provided. Energization of trip coil 17 magnetically attracts a pivotally mounted latch 18 which releases a movable switch member 19 for rapid circuit interrupting action. Upon opening of circuit interrupter 16, an auxiliary switch 20 operates to deenergize the trip coil 17.

Three current transformers 21, 22 and 23 are coupled to conductors 11a, 11b and 11c, respectively, at terminal A. As can be seen in Fig. 2, the Y-connected secondary circuits of these transformers supply three time-overcurrent units 24, 25 and 26 and three fault responsive units 27, 28 and 29. The three fault responsive units 27, 28 and 29 are also supplied with voltages derived from the electric power circuit by a pair of potential transformers 30 and 31.

The time-overcurrent units 24, 25 and 26 may be of any suitable type operable in delayed response to a predetermined quantity of current. The operating time is an inverse function of line current magnitude. Each unit is associated with a different phase conductor and responds to an overcurrent condition in the associated phase. Since all three time overcurrent units are identical, units 24 and 25 are shown in block form, and only unit 26 is shown in detail.

As can be seen in Fig. 2, I have chosen to illustrate by way of example a conventional time-overcurrent unit 26 comprising a rotatable reduction disk 32 and a shaded-pole actuating electromagnet 33. Disk 32 is carried by a transverse shaft 34 which is rotatably supported by means of suitable upper and lower bearings not shown. Shaft 34 also carries a switch arm 35 which is disposed in cooperating relationship with a pair of stationary switch contacts 36. The time overcurrent unit operates to rotate induction disk 32 in a clockwise direction, as viewed in the drawing, thereby moving switch arm 35 into engagement with contacts 36.

The actuating electromagnet 33 is provided with a winding 37 supplied by current transformer 23. The magnitude of magnetic flux in the electromagnet is determined by the ampere-turns of winding 37. The pole faces of electromagnet 33 are disposed on opposite sides of the induction disk 32, and a portion of each pole face is encircled by a shading ring or coil 38 of current conducting material to cause the flux in this portion to lag the flux in the unshaded part of the pole. Operating torque is created in the induction disk 32 by the interaction of flux from one portion of the shaded pole with eddy currents that are induced in the induction disk by flux from the other portion of the pole. Thus the operating torque, which tends to rotate disk 32 clockwise, is proportional to the square of the ampere-turns of winding 37. A suitable permanent magnet 39 is used to provide retarding or damping action whenever disk 32 is rotating.

A spiral spring 40 having opposite ends fixed to a stationary support and to the shaft 34 respectively provides restraining force opposing clockwise movement by disk 32 and biasing the disk to a reset position wherein switch arm 35 is disengaged from contacts 36. By appropriately selecting the number of turns of winding 37, operating torque will overcome the restraining force whenever winding 37 is energized by current in excess of a quantity which corresponds to a predetermined magnitude of line current in the associated phase conductor 11c. The predetermined magnitude of line current is the minimum value of fault current for which operation is desired at terminal A.

For any given magnitude of line current greater than the aforesaid predetermined magnitude, the time required by induction disk 32 to rotate until the switch arm 35 engages contacts 36 is determined by the initial position of switch arm 35 with respect to the contacts 36. Suitable means, not shown, may be utilized to adjust this initial position as desired. For any given initial setting of switch arm 35, the operating time of unit 26 depends upon the magnitude of line current which determines the magnitude of operating torque. As the current increases, the operating time becomes shorter. Thus, the time delay of a time-overcurrent unit is inversely related to the amount of line current in excess of the aforesaid predetermined magnitude.

The fault responsive units 27, 28 and 29 each comprise two components: a conventional distance relay of the mho type; and means for changing the operating range or reach of the mho relay. Each unit is connected to respond to phase-to-phase faults involving a different pair of phase conductors. Thus, unit 27 responds to faults occurring between phase conductors 11a and 11b within its operating range, unit 28 responds to faults which occur between phase conductors 11b and 11c within its operating range, and unit 29 similarly responds to faults between conductors 11c and 11a. Since all three fault responsive units are identical, units 27 and 28 are shown in block form, and only unit 29 is shown in detail.

The structure of the mho relay component of unit 29, as illustrated schematically in Fig. 2 by way of example, comprises a magnetic frame member 41 having two pairs of oppositely disposed spaced apart poles 42a and 42b and 43a and 43b. An induction cylinder 44 is mounted for rotary movement on its axis which is disposed perpendicular to and intermediate the poles. Suitable windings are located on each pole, and the fluxes produced by currents flowing in these windings induce eddy currents in the induction cylinder 44. The eddy currents interact with the fluxes in a manner to create torques which tend to rotate cylinder 44. A switch arm 45 carried on the axis of cylinder 44 is disposed in cooperating relationship with a pair of stationary switch contacts 46. The mho relay operates to rotate induction cylinder 44 in a counterclockwise direction, as viewed in the drawing, thereby moving switch arm 45 into engagement with contacts 46.

The switch contacts 46 are interconnected in parallel circuit relationship with similar contacts of fault responsive units 27 and 28, and this parallel circuit together with the auxiliary switch 20 is employed to connect trip coil 17 of circuit interrupter 16 for energization by a suitable source of direct voltage represented in Fig. 2 by the supply conductors 47 and 48. Thus, trip coil 17 is energized and circuit interrupter 16 is tripped in response to operation of any one of the fault responsive units 27, 28 and 29.

The electrical connections of the mho relay windings will now be considered. Two windings 49 and 50 are located on pole 42a and are supplied with current from the secondary circuits of current transformers 23 and 21 respectively. Operating flux is produced by the net ampere-turns of windings 49 and 50, and the value of this flux is proportional to transmission line current which will be designated by the letter $i$.

A pair of series connected windings 51 and 52 are disposed on poles 43a and 43b respectively, and these windings are supplied with potential transformer voltage representing the transmission line voltage between phase conductors 11a and 11c. Windings 51 and 52 produce polarizing flux proportional to transmission line voltage which will be designated by the letter E. A capacitor 53 is connected in series with windings 51 and 52 to provide memory action and to produce a phase displacement between the voltage applied across windings 51 and 52 and the line voltage. Capacitor 53 together with windings 51 and 52 form a circuit having a natural frequency which is nearly equal to the system frequency, whereby a voltage supply to these windings is maintained for a few cycles if the voltage of potential transformer 30 or 31 should go to zero as during a transmission line fault located at terminal A. Consequently, the relay responds correctly to such a fault.

A winding 54 on pole 42b is also coupled to the potential transformers 30 and 31, and this winding is used to produce restraining flux. However, only a predetermined portion of the potential transformer voltage is supplied to winding 54. The predetermined portion is determined by an autotransformer 55 having four adjustable taps 56, 57, 58, and 59, in conjunction with a suitable switching device 60. The switching device 60 provides means for changing the connections between the autotransformer taps and winding 54, of the mho relay.

As can be seen in Fig. 2, autotransformer 55 is connected to potential transformers 30 and 31, whereby the voltage across the autotransformer windings represents the transformer line voltage E. The outer taps 56 and 59 of the autotransformer are connected through normally closed contacts 61 and 65 of device 60 to one terminal of centered-tapped resistors 62 and 66 respectively. The inner taps 57 and 58 are connected by means of normally open contacts 63 and 67 of device 60 to the other terminal of the center-tapped resistors 62 and 66 respectively. Winding 54 is connected between the center taps 64 and 68 of resistors 62 and 66 respectively.

The switching device 60 may be of any suitable type, and for the sake of illustration, I have shown in Fig. 2 a device comprising an electromagnetic attraction switch having a tension spring 69 for biasing the switch to its normal position and including an operating coil 70 for actuating the switch to an operated position when energized. Energization of coil 70 is controlled by the switch arm 35 and contacts 36 of the associated time-overcurrent unit 26, contacts 36 connecting coil 70 to a suitable source of constant direct voltage represented by the supply conductors 71 and 72.

To assure that voltage is supplied continuously to winding 54 during operation of switching device 60, thereby avoiding interruptions in restraining flux, the normally closed contacts 61 and 65 and the normally open contacts 63 and 67 are arranged to overlap. In other words, as the switch moves from its normal to its operated positions, contacts 63 and 67 close before contacts 61 and 65 open, and on the other hand, as the switch returns to its normal position after operating coil 70 has been deenergized, contacts 61 and 65 close before contacts 63 and 67 can open. The resistors 62 and 66 are provided expressly to prevent short circuiting portions of the autotransformer windings during the periods of contact overlap.

The restraining flux which is produced by winding 54 is proportional to the transmission line voltage E. As is apparent in Fig. 2, the proportion is greater with switching device 60 in its normal position than when device 60 is in its operated position. The restraining flux reacts with eddy currents induced in the induction cylinder 44 by the polarizing flux to create a restraining torque which is proportional to the square of the transmission line voltage. Thus, with switching device 60 in its normal position, restraining torque is represented by $$\frac{1}{k}E^2$$

and with the switching device in its operated position, the resulting reduced restraining torque is represented by $$\frac{1}{K}E^2$$

where $k$ and $K$ are predetermined constants, $K$ having a greater magnitude than $k$. The magnitudes of these predetermined proportionality constants are dependent upon the adjustment of the autotransformer taps 56, 57, 58, and 59. Restraining torque tends to rotate cylinder 44 clockwise as viewed in the drawing.

The interaction between operating flux produced by windings 49 and 50 and the eddy currents induced in the induction cylinder by the polarizing flux creates an operating torque which is represented by the formula $EI \cos(\phi-\theta)$, where $\phi$ is the phase angle between transmission line current and voltage and $\theta$ is a design constant of the mho relay. For transmission line faults located in the direction of terminal B with respect to terminal A, the operating torque tends to rotate induction cylinder 44 in a counterclockwise direction.

Whenever restraining torque becomes less than operating torque, the mho relay operates with substantially zero time delay to close its switch contacts 46. The condition of equality between operating and restraining torque defines the operating characteristic of the mho relay. This condition can be expressed in the conventional manner by the alternate equations $Z=k \cos(\phi-\theta)$ and $Z=K \cos(\phi-\theta)$, where Z is the apparent impedance of the transmission line as determined by the ratio $$\frac{E}{I}$$

at the local terminal A. Thus, for a given phase angle $\phi$ and proportionality constant $k$ or $K$, relay operation is obtained whenever the voltage-current ratio is less than the predetermined value of impedance Z defined by the equations set forth above.

It is convenient to represent the operating characteristic of a mho relay on the conventional impedance diagram illustrated in Fig. 3. The origin of the impedance diagram represents the physical location of the local terminal A of the protected subtransmission circuit, while the abscissa R and the ordinate jX describe values of resistance and inductive reactance respectively as determined by the vectorial relationship between transmission line voltage and current measured at terminal A. Both coordinates R and jX are scaled equally and in the same units, such as ohms, on a phase-to-netural basis. A subtransmission line has a determinable impedance which is represented, for example, by a portion of a line L. The remote terminal B is indicated on line L.

The circle identified in Fig. 3 by the reference numeral 73 represents the loci of apparent impedance values which define the initial operating range $k \cos(\phi-\theta)$ of the mho relay. This initial operating range is obtained with the switching device 60 in its normal position. Autotransformer taps 56 and 59 are adjusted and the other design constants of the mho relay are selected whereby circle 73 intersects line L at a predetermined point C which represents the impedance of the subtransmission line at a point located just short of terminal B, as is shown in Fig. 3. The distance from local terminal A to point C, which may be, for example, ninety percent of the total distance between terminals A and B, is the initial reach of the mho relay, and this reach is substantially unaffected by variations in fault current magnitude. The relatively short distance between point C and terminal B is necessary to assure selective operation with regard to the protective relaying system of adjoining subtransmission line and distribution sections.

It is well known to those skilled in the art that under normal load conditions the apparent impedance of the subtransmission circuit will fall well outside of the initial operating range of the mho relays, while upon the occurrence of any phase fault located on the subtransmission circuit within the initial reach of the relays, the apparent impedance will instantly change to a value which results in substantially instantaneous operation of a mho relay.

The circle identified in Fig. 3 by the reference numeral 74 represents the loci of apparent impedance values which define the increased or extended operating range $K \cos (\phi-\theta)$ of the mho relay. The extended operating range is obtained with the switching device 60 in its operated position. The autotransformer taps 57 and 58 are adjusted whereby circle 74 intersects the projected line L at a predetermined point D, and the distance from local terminal A to point D is the extended reach of the mho relay. The extended reach is greater than the initial reach because the effect of actuating switching device 60 from its initial normal position to its operated position is to weaken the restraining torque for any given value of transmission line voltage E, and consequently the mho relay will operate in response to less operating torque such as produced by reduced fault current resulting from a more distant fault. The area between circles 73 and 74 is known as the back-up region and comprises the impedance values at points on the distribution circuit 12 protected by the relaying system at terminal A. Whenever a phase fault condition develops on the distribution circuit in this back-up region, mho relay operation is obtained only after an appropriate time-overcurrent unit 24, 25 or 26 operates to actuate switching device 60 to its operated position thereby increasing the operating range of a mho relay. The time-overcurrent units in conjunction with the respective switching devices comprise time-overcurrent means for changing the operating range of the associated mho relay.

From the foregoing detailed description of the components and circuitry of my relaying system, its mode of operation may now be readily followed. Assume first that phase conductors 11a and 11c are short circuited at some point within the initial reach of the mho relay component of fault responsive unit 29. The mho relay component will operate instantly to close its contacts 46 thereby energizing trip coil 17 and tripping the circuit interrupter 16 to isolate the faulted subtransmission line section 11 from the source of generation.

Assume now that a similar fault occurs on a utilization feeder within the extended reach of the mho relay. Since the fault is beyond the initial or normal reach of the mho relay, contacts 46 cannot be closed immediately. However, the time-overcurrent units 24 and 26 will realize a delayed response to the resulting fault current which is greater than the predetermined magnitude of current required at terminal A to operate these units. Induction disk 32 rotates for a time inversely related to the amount of fault current in excess of the predetermined magnitude until switch arm 35 engages the switch contacts 36 thereby energizing operating coil 70 and actuating switching device 60 to its operated position. A smaller portion of transmission line voltage E is now supplied through autotransformer 55 to winding 54, and the torque restraining the mho relay operation is weakened, thereby in effect increasing the ohmic reach of the relay and increasing its operating range. The amount of current required in windings 49 and 50 to produce sufficient operating torque to cause relay operation is now less than initially, and the relay operates instantly to move switch arm 45 into engagement with contacts 46. This closure of contacts 46 energizes the trip coil 17 of circuit interrupter 16. The resulting delayed operation of the relaying system at terminal A allows time for the appropriate power fuse 13 to operate thereby isolating the faulted utilization feeder before the back-up protection provided by the relaying system at terminal A takes effect.

The overall operating characteristic of the relaying system at terminal A is illustrated graphically in Fig. 4. As indicated by line 75, a phase fault within the initial operating range of the mho relays causes substantially instantaneous operation. Solid line 76 shows that for any phase fault occurring on the distribution circuit or utilization apparatus within the extended operating range of the mho relays, the relaying system at terminal A operates with inverse time delay as determined by the time-overcurrent units 24, 25 and 26. That is, the operating time of a time-overcurrent unit is inversely related to the magnitude of fault current which in turn will be inversely proportional to the distance between the fault and terminal A. It should be readily apparent that the inverse time characteristic of the time-overcurrent units will coordinate selectively with the similar operating characteristics of the power fuses 13 which provide primary protection for the utilization apparatus 15. The high-speed operation of my relaying system in response to faults within the initial operating range is substantially unaffected by changes in connected generation capacity, but the delayed operation in response to faults in the back-up region is varied by changes in generation. For example, broken line 77 as compared with line 76 represents the delayed operating characteristic of the system during reduced generation condition. This deviation in time delay is desirable for optimum coordination with the power fuses 13 whose operating characteristics are similarly affected by changes in generation.

While I have shown and described a preferred form of my invention by way of illustration, many modifications will occur to those skilled in the art. I therefore contemplate by the appended claims to cover all such modifications as fall within the true spirit and scope of my invention.

What I claim as new and desire to secure by Letters Patents of the United States is:

1. In a relaying system for protecting an electric power transmission circuit provided with an electroresponsively tripped circuit interrupter, directional discriminating relay means having a distance operating characteristic and connected for tripping the circuit interrupter only in response to a fault on the protected circuit, said relay means having a predetermined initial operating range and a predetermined extended operating range, and time-overcurrent means operable after a variable time delay inversely related to the amount of circuit current greater than a predetermined magnitude to change the operating range of said relay means.

2. In a relaying system for protecting an electric power transmisison line having an electroresponsively tripped circuit interrupter at one end thereof, an instantaneous mho relay energized by line current and voltage and having normal and extended predetermined operating ranges, and time-overcurrent means energized by line current and operable to change the operating range of said mho relay in delayed response to greater than a predetermined magnitude of line current, the operating time of said time-overcurrent means being determined by the magnitude of said line current, said circuit interrupter being tripped in response to the operation of said mho relay.

3. A relaying system for protecting an electric power transmission circuit connected to a source of alternating current by an electroresponsively tripped circuit interrupter comprising, a mho relay responsive to circuit current and voltage for tripping the circuit interrupter, means connected to change relay reach from an initial amount to an extended amount, and a time-overcurrent unit having an operating time inversely related to the magnitude of circuit current for actuating said relay reach changing means.

4. A relaying system for a section of an electric power transmission system having an electroresponsively tripped circuit interrupter at one end of the section comprising, a substantially instantaneously operable mho relay having an initial reach extending from said one end to a predetermined point of the section for tripping said circuit interrupter, and time-overcurrent means operable to change the reach of said mho relay from its initial value after a time delay inversely related to the amount of section current in excess of a predetermined magnitude.

5. In a relaying system for protecting an electric power transmission line having an electroresponsively tripped circuit interrupter at one end thereof, a mho relay operable in response to a line fault occurring within its reach, said mho relay having an initial reach which extends from said one end to a predetermined point on the protected line, and time-overcurrent means operable in response to at least a predetermined magnitude of line current to increase the reach of said mho relay, the operating time of said time-overcurrent means being an inverse function of the magnitude of said line current, said circuit interrupter being tripped upon operation of said mho relay.

6. In a relaying system for protecting an electric power transmission line having an electroresponsively tripped circuit interrupter at one end thereof, a distance relay of the mho type having predetermined initial and extended operating ranges and responsive only to faults occurring on the protected line within its operating range for tripping the circuit interrupter, and time-overcurrent means operable in response to at least a predetermined magnitude of line current to increase the operating range of said distance relay, the operating time of said time-overcurrent means being an inverse function of the magnitude of said line current.

7. A relaying system for a section of an electric power transmission system including an electroresponsively tripped circuit interrupter at one end of the section comprising, a fault responsive distance relay of the mho type having a predetermined initial ohmic reach and a predetermined extended ohmic reach and operable for tripping the circuit interrupter, and time-overcurrent means connected to be operably energized in response to at least a predetermined magnitude of current in the section for changing the ohmic reach of said distance relay from said initial to said extended amount, the operating time of said time-overcurrent means being an inverse function of the magnitude of section current.

8. A relaying system for protecting an electric power transmission circuit connected to a source of alternating current by an electroresponsively tripped circuit interrupter comprising, a fault responsive mho relay provided with windings connected to be energized in accordance with the circuit voltage, time-overcurrent means operable to decrease by a predetermined proportion the voltage supplied to the voltage windings of said mho relay after a time delay inversely related to the amount of circuit current greater than a predetermined magnitude, said circuit interrupter being tripped in response to a fault which effects operation of said mho relay.

9. In a relaying system for protecting a polyphase electric power circuit including an electroresponsively tripped multipole circuit interrupter, a plurality of mho relays each being associated with a different phase of the circuit and each being operable only in response to faults occurring on the protected circuit within its operating range for tripping the circuit interrupter, each of said mho relays having predetermined initial and extended operating ranges, and a plurality of time-overcurrent means each being coupled to a different phase of the circuit and operable for increasing the operating range of the associated mho relay after a time which is determined by the amount of associated phase current in excess of a predetermined magnitude.

References Cited in the file of this patent

UNITED STATES PATENTS

| | | |
|---|---|---|
| 1,839,467 | Crichton | Jan. 5, 1932 |
| 2,214,866 | Warrington | Sept. 17, 1940 |
| 2,584,765 | Warrington | Feb. 5, 1952 |